United States Patent
Poletaev et al.

(10) Patent No.: US 7,316,991 B1
(45) Date of Patent: Jan. 8, 2008

(54) COMPOSITION AND PROCESS FOR OIL EXTRACTION

(75) Inventors: Sergei Poletaev, Newport Beach, CA (US); Anatoly Demakhin, Saratov (RU)

(73) Assignee: Enhanced Recovery Systems Limited, London (GB)

( * ) Notice: Subject to any disclaimer, the term of this patent is extended or adjusted under 35 U.S.C. 154(b) by 184 days.

(21) Appl. No.: 10/111,853

(22) PCT Filed: Nov. 1, 2000

(86) PCT No.: PCT/GB00/04194

§ 371 (c)(1),
(2), (4) Date: Apr. 24, 2003

(87) PCT Pub. No.: WO01/33039

PCT Pub. Date: May 10, 2001

(30) Foreign Application Priority Data

Nov. 1, 1999 (GB) .................. 9925835.2

(51) Int. Cl.
*C09K 8/60* (2006.01)
*E21B 21/00* (2006.01)
*E21B 43/16* (2006.01)

(52) U.S. Cl. .............. 507/233; 507/127; 507/234; 507/901; 507/906; 166/305.1

(58) Field of Classification Search .......... 507/901, 507/906, 127, 233, 234
See application file for complete search history.

(56) References Cited

U.S. PATENT DOCUMENTS

| | | | | | |
|---|---|---|---|---|---|
| 3,302,719 A | * | 2/1967 | Fischer | .................. | 166/280.2 |
| 3,625,892 A | * | 12/1971 | Watanabe | .................. | 507/203 |
| 3,933,672 A | * | 1/1976 | Bartolotta et al. | .......... | 510/438 |
| 4,074,536 A | * | 2/1978 | Young | .................. | 405/264 |
| 4,183,814 A | * | 1/1980 | Ramachandran | ............ | 507/127 |
| 4,197,912 A | * | 4/1980 | Barnhouse | ............... | 166/305.1 |
| 4,312,765 A | * | 1/1982 | Block | .................. | 507/127 |
| 4,316,807 A | * | 2/1982 | McDaniel et al. | .......... | 507/127 |
| 4,498,538 A | * | 2/1985 | Watkins et al. | ............. | 166/295 |
| 4,508,628 A | * | 4/1985 | Walker et al. | ............... | 507/129 |
| 4,749,569 A | * | 6/1988 | Gianino et al. | ............... | 424/65 |
| 5,376,629 A | * | 12/1994 | Smith | .................. | 507/127 |
| 5,843,872 A | * | 12/1998 | Rayborn et al. | ............ | 507/106 |
| 6,608,017 B1 | * | 8/2003 | Dihora et al. | ............... | 510/349 |

FOREIGN PATENT DOCUMENTS

| | | | |
|---|---|---|---|
| JP | 10-279433 A | * | 10/1998 |
| RU | 2105142 | | 2/1998 |
| RU | 2125649 | | 1/1999 |

OTHER PUBLICATIONS

M. T. Abasov, et al., Russian Academy of Sciences, "Modern Methods for Enhancing Oil Recovery from Reservoirs," MNTK Nefteotdacha, Moscow, Nukia, 1992.

Gusev, et al., "Wacke-Chemie GmbH Organosilicon Compounds for Improving Oil Recovery from Formations," Neftyanoye Khozyaystvo 1995, 65-68.

* cited by examiner

*Primary Examiner*—Randy Gulakowski
*Assistant Examiner*—Timothy J. Kugel
(74) *Attorney, Agent, or Firm*—Finnegan Henderson Farabow Garrett & Dunner LLP

(57) ABSTRACT

The invention relates to a composition for use in the extraction of oil and to a method of extracting oil using the composition. The composition comprises components A, B and C in which: A is a first solid hydrophobic material which is in-soluble in an organic solvent selected from light fractions of petroleum, distillate, kerosene, acetone, gasoil, hexane, benzene and condensate; B is a second hydrophobic material which is either soluble in or can be emulsified with an organic solvent selected from light fractions of petroleum, distillate kerosene, acetone, gasoil, hexane, benzene and condensate; and C is a retention improving material comprising a mineral material. A solvent, D, is added before the composition is used to treat an oil well. In oil well systems in which water or surfactant is pumped into the stratum through an injection well under pressure so that petroleum is forced from the rock stratum into the bottom hole zone of an extraction well, the composition is added to the extraction well.

75 Claims, No Drawings

COMPOSITION AND PROCESS FOR OIL EXTRACTION

The present invention relates to a process for the extraction of oil and to a reagent for use in the extraction process. In particular, the invention relates to a process for raising the productivity of oil wells in seams in the late stages of exploitation.

Petroleum is obtained from an oil well in the form of an oil-in-water emulsion which is pumped from the bottom hole zone of the well. However, after prolonged extraction of petroleum from wells, the oil collection properties of the oil-bearing rock stratum gradually deteriorate and the composition of the petroleum emulsion changes, with the water content increasing as the well becomes exhausted. The result of these changes is that extraction becomes progressively more difficult and less economically viable.

The present invention relates to a composition and a method for modifying the properties of the oil bearing rock stratum so as to increase the proportion of oil present in the oil-water mixture which is extracted from the oil well.

Attempts have, of course, been made to maintain the productivity of oil wells during the later stages of oil extraction and means including gas, thermal, hydraulic fracturing and physico-chemical processes have all been tested. Many of these methods are discussed by Abasov et al, Contemporary Methods of Increasing Oil Yield of Strata, *MNTK Nefteotdacha*, Moscow, Nauka, 1992 5-130. However, most of these methods are insufficiently effective to justify the outlay in materials and energy.

More recently, methods of increasing the productivity of oil wells have been developed which are based on the concept of making the oil bearing stratum more hydrophobic. Such methods have been used, in particular, for treating hydrophilic strata in which oil is present in an emulsion with a high water content (usually greater than 60%). This type of method was developed by Gusev et al ("Silicon-organic Compounds of the Firm Wacke-Chemie GmbH for Raising Oil Yield of Strata", *Neftyanoye Khozyaystvo,* 1995(3), 65-68), who treated the bottom hole zone of injection wells with a silicon-organic emulsion, Extract-700 (Wacke-Chemie GmbH), and then expelled the petroleum from the collector using hydrodynamic pressure.

This method has the effect of reducing the leakage of water from the bed rock into the oil emulsion and results in a decreased water content of the petroleum-containing emulsion extracted from the well. It also increases the injectivity of injection wells by as much as 20% on average. However, in many situations it is not cost effective because of the high cost of the reagents. What this method has shown, however, is that it is possible to increase the yield of an oil well by making the stratum more hydrophobic.

An alternative method was developed by Smirnov et al (RU--A-2105142). In this method, the stratum was made more hydrophobic by the use of a dispersion of a solid hydrophobic material in an organic solvent. The solid hydrophobic materials are typically based on silicon dioxide and are formed by the modification of the surface of particulate solids such as soot, a highly dispersed pyrogenic silica such as Aerosil™, talc or perlite.

Using this method, it has been possible to increase the injectivity of injection wells by 200-300% and to obtain a three- or four-fold increase in the productivity of the wells.

A refinement of this method is described in RU-A-2125649. Here, the bottom hole zone of the injection well is treated with a dispersion of a solid hydrophobic material in an organic solvent. Water is pumped into the injection well and the petroleum is expelled from the extraction well by hydrodynamic water pressure. The injection and extraction wells are then further treated by a 0.1-2.5% w/w suspension of a highly dispersible hydrophobic material in an organic solvent. 0.5 to 3 $m^3$ of this suspension is used for every meter of the effective zone of the stratum thickness.

The hydrophobic substances used in this method are highly dispersible materials with chemically modified surfaces. The dispersible materials include tetrafluoroethylene, polyvinyl alcohol, and oxides of titanium, silicon, iron, chromium, aluminium and zinc, with boundary angles of 114-178° and degree of hydrophobisation of 96.0 to 99.99%. The solvents selected are light fractions of petroleum, such as kerosene, acetone, gasoil, hexane and benzene. The process is carried out at a suspension pumping pressure of 4.0 to 38.0 MPa using petroleum as the expulsion liquid. After pumping the suspension into the stratum it is allowed to remain there under pressure for 12 to 96 hours (the reaction time) before pumping of the well is resumed.

The highly dispersible hydrophobic material penetrates the stratum and changes the surface characteristics of the water and oil in such a way that the oil flows more quickly through the rock stratum than the water does. Therefore, the proportion of oil in the mixture extracted from the well is increased.

This method results in an increase in the injectivity of the injection well by 200-300%, a reduction in water content of 6 to 96% and a three- to ten-fold increase in the productivity of the well. The effect is observable for up to 1½ years.

However, the methods described above suffer from various disadvantages. Firstly, the increase in hydrophobicity of the bottom hole zone of the rock stratum is only short term because the suspension material penetrates only a short distance (less than one meter) into the collector rock. Also, for strata of medium and high permeability, the efficiency of the process is greatly reduced because the highly dispersed suspensions are easily washed out of the pores in the rock.

It is therefore an object of the present invention to provide an increase in the yield of oil wells in rock strata with a high permeability and the present inventors have achieved this by the provision of a novel composition which can be added to the bottom of an oil well.

In a first aspect of the present invention, there is provided a composition comprising components A, B and C in which:

A is a first solid hydrophobic material which is insoluble in an organic solvent selected from light fractions of petroleum, distillate, kerosene, acetone, gasoil, hexane, benzene and condensate;

B is a second hydrophobic material which is either soluble in or can be emulsified with an organic solvent selected from light fractions of petroleum, distillate, kerosene, acetone, gasoil, hexane, benzene and condensate; and C is a retention improving material comprising a mineral material.

The composition of the present invention may be supplied as a concentrate but, before use, must be mixed with a carrier, D, which may be a non polar organic solvent, for example light fractions of petroleum distillate, kerosene, acetone, gasoil, hexane, benzene and condensate being light fractions of petroleum.

Preferably, the components A and C have particle sizes which are compatible with the pore sizes in the oil-bearing rock and which render them highly dispersible.

Thus, the composition of the present invention consists of components A, B and C and, optionally, a solvent, D. The composition is believed to work in the following manner although the effectiveness of the composition in increasing the yield from oil wells is not affected by the correctness or otherwise of the theories on its mode of action.

The hydrophobic material B is dissolved in or emulsified with the solvent D and the solution or emulsion penetrates the rock stratum and makes it more hydrophobic. Therefore, it becomes easier for oil to pass through the rock stratum and more difficult for water to pass through it. The retention improving material C is included in order to provide better retention of the hydrophobic solid A in the rock stratum adjacent the bottom hole zone of the well and component C therefore assists component A in forming a hydrophobic membrane between the stratum and the extraction well. This hydrophobic membrane limits the amount of water which can pass from the rock stratum into the extraction well.

As discussed above, one of the problems with the prior art is that the hydrophobic solid penetrates at most only one meter into the rock stratum, and usually considerably less than this. Also, because it is a highly dispersible solid of small particle size, it is easily washed out of the rock stratum. In contrast, component B of the present invention is a liquid and is able to penetrate several tens of meters into the rock stratum. Also, being a hydrophobic liquid, it is less easily washed out of the rock stratum. In addition, the composition of the present invention has a double action in that it not only affects the hydrophobicity of the rock stratum but also forms a hydrophobic membrane between the rock stratum and the extraction well. It is therefore more effective than the compositions of RU 2125469 as well as being longer lasting.

In order to demonstrate its effectiveness, the composition of the present invention was added to a well producing an emulsion containing 80% water and 20% oil. After use of the composition of the present invention, the proportion of oil present in the emulsion rose to 30%.

The material A preferably has a particle size of from about 5 to about 100pm, more preferably about 10 to 80 μm. Usually it will have a boundary wetting angle of 114° to 178° and it may be selected from the chemically surface modified materials specified in RU 2125649—namely tetrafluoroethylene, polyvinyl alcohol and the oxides of titanium, silicon, iron, chromium, aluminium and zinc.

It is greatly preferred, however, that the material A is a silicon based material formed by the reaction of a starting material comprising from 80% to 100%, and preferably 85 to 90% w/w, silicon dioxide with a compound of the formula (I):

$$R_2SiX_2 \qquad (I)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro; and X is chloro, fluoro or bromo.

Usually, the starting material will be silicon dioxide itself or a material containing silicon dioxide, such as gaize. The starting material may also comprise oxides or salts of metals such as iron, aluminium, potassium and calcium; and water. If the silicon dioxide-containing starting material is an ore, these oxides or salts may form constituents of that ore. Alternatively, a metal salt or oxide as specified above may be added to the silicon dioxide-containing starting material.

It is preferred that, in the compound of general formula (I) chosen for the preparation of material A, R is methyl, ethyl or propyl and X is chloro or bromo. The most frequently selected compound of general formula (I) is dichlorodimethylsilane.

The reaction of the starting material with the compound of general formula (I) to give material A may be conducted in a non-polar or low polarity organic solvent under pressurised conditions and at a temperature of 50 to 70° c. When the compound of formula (I) is dichlorodimethylsilane, the ratio of silicon dioxide to dichlorodimethylsilane may be from 3.5:1 to 5:1.

Material B preferably comprises an organohalosilane of formula (I):

$$R_2SiX_2 \qquad (I)$$

where R and X are as defined above;

or a polysiloxane of the formula (II):

$$R_3Si-[O-SiR_2-]_nR \qquad (II)$$

where R is as defined above and n is an integer.

Many examples of compounds of formulae (I) and (II) are known but it is preferred, in both cases, that R is a $C_1$-$C_6$ alkyl group, particularly methyl, ethyl, n-propyl or i-propyl. In compounds of formula (I), it is preferred that X is chloro. Dimethyldichlorosilane is an example of a compound of formula (I) and dimethylpolysiloxane is an example of a compound of formula (II).

For most rock types, the second hydrophobic compound, B, may be either a compound of formula (I) or a compound of formula (II). However, when the collector rock is a carbonate-containing rock, it is greatly preferred that the second hydrophobic compound is of formula (II), for example dimethylpolysiloxane.

Highly dispersible mineral materials which can be used as the retention improving material, C, are well known to those skilled in the art. Examples include clays such as bentonite and also materials such as phosphogypsum.

The composition of the present invention is obtained by mixing components A, B and C. Before use, the solvent, D must be added and the ingredients mixed until a homogeneous mixture is obtained.

Although the proportions of materials A, B and C will vary depending upon the type of rock in which the composition is to be used, a concentrate composition containing components A, B and C with no solvent, may have its ingredients in the following proportions by weight:

A 5-80%, preferably about 10-20%
B 5-80%, preferably about 10-20%
C 15-90%, preferably about 65-75%.

In a composition containing a solvent and ready to be used in an oil extraction process, it is preferred that the combined first and second hydrophobic materials (A and B) are present in the composition in an amount of from 0.5 to 3% w/w and the retention improving material is present in a concentration of 0.5 to 5% w/w, with the precise amount depending on the permeability of the rock stratum. The balance of the composition is solvent and it will be understood by persons skilled in the art that proportions given in this specification in terms of % w/w refer to the weight of a constituent measured relative to the overall weight of the composition.

If the concentrations of hydrophobic substances are lower than those specified, the required result is not achieved, while if higher concentrations are used, the reagents coagulate and cannot perform their function. Therefore, the required result is also not achieved.

As mentioned above, the quantity of retention improving substance present in the composition will depend upon the type and permeability of the collector rock stratum in which the composition is to be used. The volume of the threshold space must also be taken into consideration. Table 1 below can be used to calculate the required concentration of retention improving substance.

TABLE 1

| Permeability of Rock Stratum (millidarcies) | Concentration of Retention Improving material (% w/w) |
|---|---|
| ≦50 | 0.5 |
| ≧50 ≦ 150 | 0.5-1.0 |
| ≧150 ≦ 500 | 1.0-5 |

The composition of the present invention can be used to raise the productivity of any type of oil well and, therefore, in a second aspect of the invention there is provided a method for extracting oil from a well, comprising adding to the well a composition of the first aspect of the present invention.

The volume of composition of the first aspect of the invention pumped into the bottom hole zone of the well may be calculated by allowing 1.5 to 3 m$^3$ for every meter of the effective thickness of the rock stratum revealed by perforation.

The composition is forced into the rock stratum by petroleum at a pressure of 5.0 to 35 MPa. After the reagent has been pumped into the rock stratum, it is kept there, preferably under pressure, for 12 to 96 hours, but preferably for 24 to 76 hours in order to allow it sufficient time to react with the rock.

Although the composition of the present invention can be used to modify the oil bearing stratum in any type of oil well, it is particularly well suited to the type of well in which petroleum is extracted by forced expulsion from extraction wells. In this method of oil production, water or surfactant is pumped into the stratum through an injection well under pressure so that petroleum is forced from the rock stratum into the bottom hole zone of an extraction well. The petroleum is obtained in the form of an oil-in-water emulsion which is pumped from the bottom hole zone of the extraction well.

Therefore in a further aspect of the present invention, there is provided a method for the extraction of oil from a well system including an injection well and an extraction well, the method comprising adding to the extraction well a composition according to the first aspect of the invention.

The volume of composition of the first aspect of the invention pumped into the bottom hole zone of the extraction well may be calculated by allowing 1.5 to 3 m$^3$ for every meter of the effective thickness of the rock stratum revealed by perforation.

As before, the composition is forced into the rock stratum by petroleum at a pressure of 5.0 to 35 MPa. After the reagent has been pumped into the rock stratum, it is kept there, preferably under pressure, for 12 to 96 hours, but preferably for 24 to 76 hours in order to allow it sufficient time to react with the rock.

This method may be further improved by the additional step of treating the bottom hole zone of the injection well with a suspension of a highly dispersible hydrophobic material, E, in an organic solvent. This highly dispersible material, E, may be selected from the same group of materials as component A of the composition of the first aspect of the present invention. The organic solvent may be chosen from the same group of solvents as D of the first aspect of the invention. The preferred choices for component A of the composition also apply to the hydrophobic material E which is added to the bottom hole zone of the injection well.

In the suspension for treating the bottom hole zone of the injection well, it is preferred that the dispersible material, E, is present in a concentration of from 0.1 to 1% w/w. As with the composition of the first aspect of the invention, if the concentration of hydrophobic material, E, is lower than that specified, the required result is not achieved, while if a higher concentration is used, the reagents coagulate and cannot perform their function. Therefore, the required result is also not achieved.

The volume of the suspension pumped into the bottom hole zone of the injection well may be calculated by allowing 1-2 m$^3$ for every meter of the effective thickness of the stratum revealed by perforation. The suspension may be forced into the stratum using water.

The various aspects of the invention will now be described in greater detail with reference to the 2-0 following non limiting examples.

EXAMPLE 1

Production of Substance A 75 wt % of previously dispersed gaize was loaded at room temperature into a reactor and, with the mixer working, 25 5 wt % of finely crushed chalk (calcium carbonate) is gradually added over a period of 15 to 20 minutes. 20 wt % of dichlorodimethylsilane was then added portionwise over a period of 20 to 30 minutes. With the mixer switched on, the temperature in the reactor rose to 60° C. At the same time, the reactor was blown through with dry nitrogen with the aim of removing excess hydrogen chloride, which was absorbed at the reactor output using an aqueous solution of alkali.

The product obtained from the reactor was a chemically inert, finely dispersed powder having a particle size of from 10 to 80 pm and a degree of hydrophobicity of not less than 98%. This product was used as component A in the following examples.

EXAMPLE 2

Efficacy of Compositions and Methods on Model Stratum

The efficacy of the compositions and methods of the present invention was tested on model core specimens. The model core specimens were selected to be as similar as possible to the bottom hole zone of an oil well. Geometrical and physico-chemical characteristics were taken into account as was the filtration capacity of the rock.

Thus, to determine the influence of reagents on water permeability, the following model conditions were selected.

| | |
|---|---|
| Stratum temperature | 40.5° C. |
| Length of seam model (l) | 4.5-6.5 cm |
| Rock porosity (m) | 0.12-0.25 |
| Rock permeability (K) | 0.015-0.025 μm |
| Filtration rate of water and oil on the stratum model ($W_m$) | 0.01-0.50 cm/sec |

The linear stratum models used in laboratory conditions had a diameter (d) of 30.0 mm, a cross sectional area (F) of 7.065 cm² and a length ($l_m$) of 4.0 to 5.0 cm. They were represented by natural specimens of collector rock (core material). The specimens were subjected to saturation with stratum water and dehydrated oil to determine their water and oil permeability. The studies were conducted on specimens of differing oil and water permeability using compositions in which A was the product of Example 1, B was dichlorodimethylsilane, C was bentonite; and the carrier was kerosene. The results are given in Table 2 below.

depth 1802 m was treated with 12 m³ of a composition of the present invention including the following components:

| A from Example 1 | 1.0% w/w |
| B dimethylpolysiloxane | 1.0% w/w |
| C phosphogypsum | 2.0% w/w |
| D kerosene | Balance. |

TABLE 2

| | Characteristics of stratum model | | | Weight % | Influence of reagent | | | |
| | | | | | Volume of | Reaction time | | |
| No. | Lithology | $W_0$ (μm²) | v por (cm²) | $W_1$ (μm²) | of reagents | reagent (cm²) | (hours) | $W_2$ (μm²) | $W_0/W_2$ |
|---|---|---|---|---|---|---|---|---|---|
| 1 | Sandstone | 0.029 | 4.5 | 0.0204 | A = 0.2<br>B = 0.5<br>C = 0.5 | 14 | 24 | 0.0047 | 6.1 |
| 2 | Sandstone | 0.057 | 4.6 | 0.010 | A = 0.5<br>B = 0.5<br>C = 2.0 | 14 | 24 | 0.0076 | 7.5 |
| 3 | Sandstone | 0.086 | 5.0 | 0.0122 | A = 1.0<br>B = 1.0<br>C = 1.0 | 15 | 24 | 0.0127 | 6.8 |
| 4 | Sandstone | 0.448 | 6.35 | 0.10628 | A = 1.0<br>B = 1.0<br>C = 3.0 | 19 | 24 | 0.0434 | 10.2 |

In Table 2:

$W_0$ is water permeability of the stratum model; v por is the volume of porous space of the stratum model;

$W_1$ is the water permeability of water and oil saturated model of the stratum;

$W_2$ is the water permeability of the stratum model after the use of the reagent A+B+C; and $W_0/W_2$ is the degree of reduction of water permeability of the stratum model.

Use of Composition and Method in Oilfield Conditions

The effect of the process of the invention was tested in oilfield conditions on wells of depths from 1000 m to 2500 m on strata of sedimentary rocks.

EXAMPLE 3

A low yield well (2.3 tonnes per day) in sedimentary rocks of stratum thickness 3.0 m, permeability 47 millidarcies, depth 1080 m was treated with 6 m³ of a composition of the present invention including the following components:

| A from Example 1 | 0.5% w/w |
| B dichlorodimethyl silane | 0.5% w/w |
| C bentonite | 1.0% w/w |
| D kerosene | Balance. |

This was retained in the rock stratum for 24 hours after which pumping was resumed. As a result of the treatment, the yield of the well increased to 4.7 tonnes per day. The well was continuing to work at this higher yield four months later.

EXAMPLE 4

A low yield well (3.9 tonnes per day) in sedimentary rocks of stratum thickness 5.0 m, permeability 93 millidarcies, This was retained in the rock stratum for 48 hours after which pumping was resumed. As a result of the treatment, the yield of the well increased to 6.8 tonnes per day. The well was continuing to work at this higher yield five months later.

EXAMPLE 5

A well with a yield of 6.3 tonnes per day in sedimentary rocks of stratum thickness 12.0 m, permeability 512 millidarcies, depth 1070 m, was treated with 25 m³ of a composition according to the present invention including the following components:

| A from Example 1 | 1.5% w/w |
| B dichlorodimethylsilane + dimethylpolysiloxane (1:1) | 1.5% w/w |
| C bentonite + phosphogypsum (1:1) | 3.5% w/w |
| D kerosene | Balance. |

This was retained in the rock stratum for 48 hours after which pumping was resumed. As a result of the treatment, the yield of the well increased to 20.8 tonnes per day. The well was continuing to work at a higher yield six months later.

EXAMPLE 6

The bottom hole zone of an injection well was treated with the aim of reducing pumping pressure and increasing injectivity. A well depth of 1730 m with a terrigenous collector rock in a stratum 7.5 m thick and a permeability 34 millidarcies had an injectivity of 18M³ per day for a wellhead pressure of 140 kg/cm². 11 m³ of a suspension containing 30 kg of substance A produced in Example 1 in kerosene was pumped into the well. Water was then pumped in. After three hours of pump operation, the pressure at the well head fell from 140 to 95 kg/cm², and the injectivity of the well increased to 63 m³ per day.

The invention claimed is:

1. A composition, comprising components A, B, C and D in which:

A is a first solid hydrophobic material which is insoluble in an organic solvent selected from light fractions of petroleum, acetone, gasoil, hexane, and benzene; wherein component A is a silicon based material formed by the reaction of a starting material comprising from 80% to 100% silicon dioxide with a compound of the formula (I):

$$R_2SiX_2 \qquad (I)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro; and X is chloro, fluoro, or bromo;

B is a second hydrophobic material which is either soluble in or can be emulsified with an organic solvent selected from light fractions of petroleum, acetone, gasoil, hexane, and benzene; and C is a retention improving material comprising a mineral material; and D is acetone or a non-polar organic solvent.

2. A composition as claimed in claim 1, wherein the starting material for the production of component A comprises silicon dioxide or a material containing silicon dioxide, such as gaize.

3. A composition as claimed in claim 2, wherein the starting material further comprises oxides or salts of metals from the group consisting of iron, aluminum, potassium and calcium.

4. A composition as claimed in claim 3, wherein the starting material further comprises water.

5. A process for the preparation of a composition as claimed in claim 4, the process comprising mixing components A, B, and C, adding the solvent D, and continuing mixing until a homogeneous composition is obtained.

6. A composition as claimed in claim 1, wherein component B comprises an organohalosilane of formula (I):

$$R_2SiX_2 \qquad (I)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro, and X is chloro, fluoro or bromo;

or a polysiloxane of the formula (II):

$$R_3Si-[O-SiR_2-]_nR \qquad (II)$$

where R is as defined above and n is an integer.

7. A composition as claimed in claim 6, wherein, in formulae (I) and (II), R is a $C_1$-$C_6$ alkyl group, and in formula (I), X is chloro.

8. A composition as claimed in claim 6, wherein component B is dimethyldichlorosilane or dimethylpolysiloxane or a mixture of the two.

9. A composition as claimed in claim 1, wherein, in general formula (I), R is methyl, ethyl or propyl and X is chloro or bromo.

10. A composition as claimed in claim 9, wherein the compound of general formula (I) is dichlorodimethylsilane.

11. A composition as claimed in claim 1, wherein component A has a particle size of from 5 to 100 μm.

12. A composition as claimed in claim 11, wherein component A has a particle size of from 10 to 80 μm.

13. A composition as claimed in claim 1 wherein the non-polar organic solvent is selected from the group consisting of light fractions of petroleum, gasoil, hexane, and benzene.

14. A composition as claimed in claim 13 wherein the light fractions of petroleum are selected from the group consisting of petroleum distillate, petroleum condensate, and kerosene.

15. A composition as claimed in claim 1, wherein component C is phosphogypsum or a clay such as bentonite.

16. A composition as claimed in claim 1, wherein the combined first and second hydrophobic materials are present in the composition in an amount of from 0.5 to 3% w/w, and the retention improving material is present in a concentration of 0.5 to 5% w/w, with the balance comprising solvent.

17. A composition as claimed in claim 1, comprising 5 to 80% of A; 5 to 80% of B and 15 to 90% of C in proportions by weight.

18. A composition comprising components A, B, C and D in which:

A is a first solid hydrophobic material which is insoluble in an organic solvent selected from light fractions of petroleum, acetone, gasoil, hexane, and benzene;

B is a second hydrophobic material which is either soluble in or can be emulsified with an organic solvent selected from light fractions of petroleum, acetone, gasoil, hexane, and benzene, wherein component B comprises an organohalosilane of formula (I):

$$R_2SiX_2 \qquad (I)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro; and X is chloro, fluoro or bromo;

or a polysiloxane of the formula (II):

$$R_3Si-[O-SiR_2-]_nR \qquad (II)$$

where R is as defined above and n is an integer;

C is a retention improving material comprising a mineral material; and

D is acetone or a non-polar organic solvent.

19. A composition as claimed in claim 18, wherein, in formulae (I) and (II), R is a $C_1$-$C_6$ alkyl group, and in formula (I), X is chloro.

20. A composition as claimed in claim 18, wherein component B is dimethyldichlorosilane or dimethyl-polysiloxane or a mixture of the two.

21. A composition as claimed in claim 18 wherein the non-polar organic solvent is selected from the group consisting of light fractions of petroleum, gasoil, hexane, and benzene.

22. A composition as claimed in claim 21 wherein the light fractions of petroleum are selected from the group consisting of petroleum distillate, petroleum condensate, and kerosene.

23. A method for extracting oil from a well, comprising adding to the well a composition comprising components A, B, C, and D in which:

A is a first solid hydrophobic material which is insoluble in an organic solvent selected from light fractions of petroleum, acetone, gasoil, hexane, and benzene, wherein component A is a silicon based material formed by the reaction of a starting material comprising from 80% to 100% silicon dioxide with a compound of the formula (I):

$$R_2SiX_2 \qquad (1)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro; and X is chloro, fluoro, or bromo;

B is a second hydrophobic material which is either soluble in or can be emulsified with an organic solvent selected from light fractions of petroleum, acetone, gasoil, hexane, and benzene;

C is a retention improving material comprising a mineral material; and

D is a carrier.

24. A method as claimed in claim 23, wherein the carrier D is acetone or a non-polar organic solvent.

25. A method as claimed in claim 24, wherein the non-polar organic solvent is selected from light fractions of petroleum, gasoil, hexane, and benzene.

26. A method as claimed in claim 25 wherein the light fractions of petroleum are selected from the group consisting of petroleum distillate, petroleum condensate, and kerosene.

27. A method as claimed in claim 23, wherein the volume of composition pumped into a bottom hole zone of the well is calculated by allowing 1.5 to 3 m³ for every meter of the thickness of an oil-bearing rock stratum adjacent the bottom hole zone of the well.

28. A method as claimed in claim 27, wherein the composition is forced into the rock stratum by petroleum at a pressure of 5.0 to 35 MPa.

29. A method as claimed in claim 27, wherein, after the composition has been pumped into the rock stratum, it is kept there for 12 to 96 hours.

30. A method as claimed in claim 23, wherein component A has a particle size of from 5 to 100 μm.

31. A method as claimed in claim 30, wherein component A has a particle size of from 10 to 80 μm.

32. A method as claimed in claim 23, wherein the amount of the retention improving material C is adjusted according to the retention properties of an oil-bearing rock stratum adjacent a bottom hole zone of the well.

33. A method for the extraction of oil from a well system comprising an injection well and an extraction well, the method comprising adding to the extraction well a composition comprising components A, B, C, and D in which:

A is a first solid hydrophobic material which is insoluble in an organic solvent selected from light fractions of petroleum, acetone, gasoil, hexane, and benzene, wherein component A is a silicon based material formed by the reaction of a starting material comprising from 80% to 100% silicon dioxide with a compound of the formula (1):

$$R_2SiX_2 \qquad (1)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro; and X is chloro, fluoro, or bromo;

B is a second hydrophobic material which is either soluble in or can be emulsified with an organic solvent selected from light fractions of petroleum, acetone, gasoil, hexane, and benzene;

C is a retention improving material comprising a mineral material; and

D is a carrier.

34. A method as claimed in claim 33, wherein the volume of composition pumped into a bottom hole zone of the extraction well is calculated by allowing 1.5 to 3 m³ for every meter of the thickness of an oil-bearing rock stratum adjacent the bottom hole zone of the extraction well.

35. A method as claimed in claim 34, wherein the composition is forced into the rock stratum by petroleum at a pressure of 5.0 to 35 MPa.

36. A method as claimed in claim 35, wherein, after the composition has been pumped into the rock stratum, it is kept there for 12 to 96 hours.

37. A method as claimed in claim 34, wherein, after the composition has been pumped into the rock stratum, it is kept there for 12 to 96 hours.

38. A method as claimed in 33, wherein the carrier D is acetone or a non-polar organic solvent.

39. A method as claimed in claim 38, wherein the non-polar organic solvent is selected from light fractions of petroleum, gasoil, hexane, and benzene.

40. A method as claimed in claim 39 wherein the light fractions of petroleum are selected from the group consisting of petroleum distillate, petroleum condensate, and kerosene.

41. A method as claimed in claim 33, wherein component A has a particle size of from 5 to 100 μm.

42. A method as claimed in claim 41, wherein component A has a particle size of from 10 to 80 μm.

43. A method as claimed in claim 33, wherein the amount of the retention improving material C is adjusted according to the retention properties of an oil-bearing rock stratum adjacent a bottom hole zone of the extraction well.

44. A method for the extraction of oil from a well system comprising an injection well and an extraction well, the method comprising adding to the extraction well a composition comprising components A, B, C, and D in which:

A is a first solid hydrophobic material which is insoluble in an organic solvent selected from light fractions of petroleum, acetone, gasoil, hexane, and benzene;

B is a second hydrophobic material which is either soluble in or can be emulsified with an organic solvent selected from light fractions of petroleum, acetone, gasoil, hexane, and benzene;

C is a retention improving material comprising a mineral material; and

D is a carrier;

further including the step of treating a bottom hole zone of the injection well with a suspension of a third hydrophobic material, E, in an organic solvent, wherein E is a solid hydrophobic material which is insoluble in an organic solvent selected from light fractions of petroleum, acetone, gasoil, hexane, and benzene.

45. A method as claimed in claim 44 wherein the carrier is acetone or non-polar organic solvent.

46. A method as claimed in claim 45 wherein the non-polar organic solvent is selected from the group consisting of light fractions of petroleum, gasoil, hexane, and benzene.

47. A method as claimed in claim 46 wherein the light fractions of petroleum are selected from the group consisting of petroleum distillate, petroleum condensate, and kerosene.

48. A method as claimed in claim 44, wherein, in the suspension for treating the bottom hole zone of the injection well, the dispersible material, E, is present in a concentration of from 0.1 to 1% w/w.

49. A method as claimed in claim 44, wherein the volume of the suspension containing component, E, pumped into the bottom hole zone of the injection well is calculated by allowing 1-2 m³ for every meter of the thickness of an oil-bearing rock stratum adjacent the bottom hole zone of the injection well.

50. A method as claimed in claim 44 wherein, when the material E is suspended in light fractions of petroleum, said light fractions of petroleum are selected from the group consisting of petroleum distillate, petroleum condensate, and kerosene.

51. A method for extracting oil from a well, comprising adding to the well a composition comprising components A, B, C, and D in which:
   A is a first solid hydrophobic material which is insoluble in an organic solvent selected from light fractions of petroleum, acetone, gasoil, hexane, and benzene;
   B is a second hydrophobic material which is either soluble in or can be emulsified with an organic solvent selected from light fractions of petroleum, acetone, gasoil, hexane, and benzene; wherein component B comprises an organohalosilane of formula (I):

$$R_2SiX_2 \qquad (I)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro; and
   X is chloro, fluoro, or bromo;
   or a polysiloxane of the formula (II):

$$R_3Si\text{—}[O\text{—}SiR_2\text{—}]_nR \qquad (II)$$

where R is as defined above and n is an integer;
   C is a retention improving material comprising a mineral material; and
   D is a carrier.

52. A method as claimed in claim 51, wherein the carrier D is acetone or a non-polar organic solvent.

53. A method as claimed in claim 52, wherein the non-polar organic solvent is selected from light fractions of petroleum, gasoil, hexane, and benzene.

54. A method as claimed in claim 53 wherein the light fractions of petroleum are selected from the group consisting of petroleum distillate, petroleum condensate, and kerosene.

55. A method as claimed in claim 51, wherein the volume of composition pumped into a bottom hole zone of the well is calculated by allowing 1.5 to 3 m³ for every meter of the thickness of an oil-bearing rock stratum adjacent the bottom hole zone.

56. A method as claimed in claim 55, wherein the composition is forced into the rock stratum by petroleum at a pressure of 5.0 to 35 MPa.

57. A method as claimed in claim 55, wherein, after the composition has been pumped into the rock stratum, it is kept there for 12 to 96 hours.

58. A method as claimed in claim 51, wherein component A has a particle size of from 5 to 100 μm.

59. A method as claimed in claim 58, wherein component A has a particle size of from 10 to 80 μm.

60. A method as claimed in claim 51, wherein, after the composition has been pumped into a rock stratum adjacent a bottom hole zone of the well, it is kept there for 12 to 96 hours.

61. A method as claimed in claim 51, wherein the amount of the retention improving material C is adjusted according to the retention properties of an oil-bearing rock stratum adjacent a bottom hole zone of the well.

62. A method for the extraction of oil from a well system comprising an injection well and an extraction well, the method comprising adding to the extraction well a composition comprising components A, B, C, and D in which:
   A is a first solid hydrophobic material which is insoluble in an organic solvent selected from light fractions of petroleum, acetone, gasoil, hexane, and benzene;
   B is a second hydrophobic material which is either soluble in or can be emulsified with an organic solvent selected from light fractions of petroleum, acetone, gasoil, hexane, and benzene; wherein component B comprises an organohalosilane of formula (I):

$$R_2SiX_2 \qquad (I)$$

wherein R is $C_1$-$C_6$ alkyl, $C_2$-$C_6$ alkenyl, $C_2$-$C_6$ alkynyl, phenyl or benzyl, any of which may be substituted with chloro, fluoro, bromo or nitro; and
   X is chloro, fluoro, or bromo;
   or a polysiloxane of the formula (II):

$$R_3Si\text{—}[O\text{—}SiR_2\text{—}]_nR \qquad (II)$$

where R is as defined above and n is an integer;
   C is a retention improving material comprising a mineral material; and
   D is a carrier.

63. A method as claimed in 62, wherein the carrier D is acetone or a non-polar organic solvent.

64. A method as claimed in claim 63, wherein the non-polar organic solvent is selected from light fractions of petroleum, gasoil, hexane, and benzene.

65. A method as claimed in claim 64 wherein the light fractions of petroleum are selected from the group consisting of petroleum distillate, petroleum condensate, and kerosene.

66. A method as claimed in claim 62, further including the step of treating a bottom hole zone of the injection well with a suspension of a third hydrophobic material, E, in an organic solvent, wherein E is a solid hydrophobic material which is insoluble in an organic solvent selected from light fractions of petroleum, acetone, gasoil, hexane, and benzene.

67. A method as claimed in claim 66, wherein, in the suspension for treating the bottom hole zone of the injection well, the dispersible material, E, is present in a concentration of from 0.1 to 1% w/w.

68. A method as claimed in claim 66, wherein the volume of the suspension containing component, E, pumped into the bottom hole zone of the injection well is calculated by allowing 1-2 m³ for every meter of the thickness of an oil-bearing rock stratum adjacent the bottom hole zone.

69. A method as claimed in claim 66 wherein, when the material E is suspended in light fractions of petroleum, said light fractions of petroleum are selected from the group consisting of petroleum distillate, petroleum condensate, and kerosene.

70. A method as claimed in claim 62, wherein the volume of composition pumped into a bottom hole zone of the extraction well is calculated by allowing 1.5 to 3 m³ for every meter of the thickness of an oil-bearing rock stratum adjacent the bottom hole zone.

71. A method as claimed in claim 70, wherein the composition is forced into the rock stratum by petroleum at a pressure of 5.0 to 35 MPa.

72. A method as claimed in claim 70, wherein, after the composition has been pumped into the rock stratum, it is kept there for 12 to 96 hours.

73. A method as claimed in claim 62, wherein component A has a particle size of from 5 to 100 μm.

74. A method as claimed in claim 73, wherein component A has a particle size of from 10 to 80 μm.

75. A method as claimed in claim 62, wherein the amount of the retention improving material C is adjusted according to the retention properties of an oil-bearing rock stratum adjacent a bottom hole zone of the extraction well.

* * * * *